United States Patent [19]

McInerney et al.

[11] B 3,993,621

[45] Nov. 23, 1976

[54] REINFORCED STYRENE ACRYLONITRILE COPOLYMER HAVING IMPROVED TEMPERATURE RESISTANT PROPERTIES

[75] Inventors: Edward J. McInerney; John C. Rieber; Douglas P. Thomas, all of Louisville, Ky.

[73] Assignee: General Electric Company, Louisville, Ky.

[22] Filed: Oct. 30, 1974

[21] Appl. No.: 519,095

[44] Published under the second Trial Voluntary Protest Program on February 24, 1976 as document No. B 519,095.

[52] U.S. Cl............................ 260/42.18; 260/42.44; 260/45.7 R; 260/45.75 B; 260/45.95 G; 260/898; 260/900
[51] Int. Cl.²........................................... C08K 7/14
[58] Field of Search................ 260/42.18, 898, 900

[56] References Cited
UNITED STATES PATENTS

| | | |
|---|---|---|
| 2,807,603 | 9/1957 | Parks et al. .................... 260/42.49 |
| 3,075,944 | 1/1963 | Wick.................................. 260/41 |
| 3,148,234 | 9/1964 | Boyer................................ 264/211 |
| 3,287,288 | 11/1966 | Reiling.................................. 260/4 |
| 3,644,577 | 2/1972 | Lee et al. ........................ 260/876 R |
| 3,671,487 | 6/1972 | Abolins............................ 260/40 R |
| 3,682,859 | 8/1972 | Taylor............................ 260/42.18 |

OTHER PUBLICATIONS

Hattori, Plastics Design & Processing, "The Effects of Fiber Glass Reinforcement on the Flammability Properties of Thermoplastics," Aug. 1967.

*Primary Examiner*—James H. Derrington
*Attorney, Agent, or Firm*—Francis H. Boos

[57] ABSTRACT

A styrene-acrylonitrile composition having reinforcing glass fibers, a brominated flame-retarding additive, and polytetrafluorethylene in amounts sufficient to prevent dripping of the composition at flaming combustion conditions.

7 Claims, No Drawings

REINFORCED STYRENE ACRYLONITRILE COPOLYMER HAVING IMPROVED TEMPERATURE RESISTANT PROPERTIES

BACKGROUND OF THE INVENTION

In the formulation of organic plastic compositions which are molded into various items, it is often desirable that the end product have physical properties which retard the flammability and/or ignition of the item when subjected to an ignition source. One example of a glass fiber reinforced plastic item for which flame retarding characteristics are desirable is the condenser fan of room air conditioners. If that item should ignite and sustain combustion, when subjected to an ignition source, the damage to associated electrical and mechanical equipment could be extensive.

Various flame-retarding additives have been discovered for incorporation in organic materials to prevent flaming and/or glowing combustion of the composition when subjected to an ignition source. Examples of flame-retarded organic plastic compositions may be found in U.S. Pat. Nos. 3,639,304-Raley, Jr., and 3,075,944-Nieldenbruck et al.

Although these flame retardants generally operate efficiently in preventing flaming and/or glowing combustion of various organic plastic items, it has been discovered that a flame-retarded organic plastic item has undesirable drip properties at elevated temperatures when it is of a glass fiber, reinforced, styrene-acrylonitrile copolymer that is flame retarded with a brominated flame-retarding additive. At flaming or glowing combustion conditions, portions of the composition become molten, separate from the body of the composition and fall or are moved to remote locations. At these remote locations, these separated portions can be deposited upon material which has an ignition temperature lower than the temperature of the molten portion and a fire may result.

It is therefore desirable to provide a glass fiber reinforced, flame-retarded, styrene-acrylonitrile copolymer that will not drip or separate when subjected to flaming combustion conditions.

SUMMARY OF THE INVENTION

In accordance with this invention, a composition comprises about 50 to about 80 weight percent styrene-acrylonitrile, at least 8 weight percent reinforcing glass fibers, a brominated flame-retarding additive, and polytetrafluorethylene in an amount sufficient to prevent dripping of the composition at flaming combustion conditions.

DETAILED DESCRIPTION OF THE INVENTION

The composition of this invention has improved combustion-resistant properties. In addition to having properties which inhibit flaming and glowing combustion of the composition, the composition further inhibits against dripping under combustion conditions.

In the composition, the styrene-acrylonitrile is in an amount in the range of about 50 to about 80 weight percent, the reinforcing glass fibers are in an amount of at least 8 weight percent, and the flame-retardant material is a brominated flame retardant.

It is known in the art that various polymer compositions can be flame retarded with chlorines or bromine containing flame-retarding additives. It has been discovered, however, that where styrene-acrylonitrile copolymer is a basic resin of the composition, i.e., comprises at least 50 weight percent of the composition, that bromine flame-retarding additives provide improved flaming and glowing combustion retardance.

However, where the composition is reinforced with glass fibers in order to provide improved dimensional stability and strength properties for resultant articles formed of the material, the glass fibers associate with the styrene-acrylonitrile composition in a manner which results in the composition having undesirable drip characteristics at flaming combustion conditions. The reason for the dripping when the glass fibers are present in the composition is not known with certainty. However, it is believed that it results from the higher thermal conductivity of the composite material.

By the term "flaming or glowing combustion," as utilized herein, it is meant a chemical oxidation accompanied by light and heat. By the term "drip characteristics," as utilized herein, it is meant that at flaming or glowing combustion conditions, portions of the composition become molten, separate from the body of the composition and fall or are moved to remote locations.

The styrene-acrylonitrile of this invention, hereinafter referred to as "SAN" for convenience, can be any styrene-acrylonitrile copolymer.

SAN is a copolymer which can have the transparency of polystyrene, but exhibit greater strength and chemical resistance. The tensile, flexural, and impact strength of SAN are higher than polystyrene. This unique combination of properties provides increased toughness to a part molded therefrom and reduces breakage of the part.

SAN is commercially produced by several chemical companies, for example RMDA-4520, a tradename of SAN, manufactured by Union Carbide Corporation, 270 Park Avenue, New York, N.Y.; Tyril 860, a tradename of SAN, manufactured by Dow Chemical Company, Midland, Mich.; and Lustran A-21, a tradename of SAN, manufactured by Monsanto Chemical, St. Louis, Mo.

The brominated flame-retarding additive of this invention can be various brominated biphenyl oxides or brominated biphenyls that are known in the art. For example, decabromodiphenyl oxide is designated FR-300-BA and is manufactured by Dow Chemical Company, Midland, Mich. This product has a bromine content in a typical range of 81-83 percent by weight.

The brominated flame-retardant additive can also be utilized with a synergist such as antimony oxide to obtain a high degree of flame retardancy at a reduced total flame retardant and synergist level. An example of the antimony oxide that can be utilized in this invention is antimony trioxide $SB_2O_3$ which is manufactured under the tradename of Thermoguard S by M&T Chemicals, Inc., Rahway, N.J.

The amount of synergist used depends upon the resultant polymer system and is a value that is routinely determined by one skilled in the art. Example usage that is recommended is two to three parts of the brominated flame-retarding additive for each part of the synergist material. The amount of brominated flame-retarding additive utilized depends upon the desired properties of the composition. The brominated flame-retarding additive is generally in the range of about 7 to about 10 weight percent of the composition of this invention.

The glass fibers can be in any form, for example as chopped fibers or roving. When added to SAN, the fibers improve the strength, stiffness, temperature resistance, dimensional stability, and reduce the thermal expansion of the resultant composition.

The glass fibers are commercially available from various companies, for example 885AB Chopped Strand, manufactured by Owens-Corning Fiberglas Corporation, Fiberglas Tower, Toledo, Ohio.

Further additives, such as pigments, can be utilized in forming the composition of this invention in order to provide preferred properties in the resultant product.

It has been discovered that the addition of glass fibers to a non-dripping, flame-retarded SAN results in a product having objectionable drip characteristics. This results at glass fiber contents as low as 8 weight percent which is considered the lowest practical level from a mechanical property standpoint.

Two methods of eliminating this objectionable characteristic have been discovered:

1. The addition of high levels of glass fibers which increase the melt modulus and, as a result, mechanically prevent dripping. This, in combination with the necessary flame-retardant additive loading, has the negative effects of exceeding the practical loading limit of the SAN, resulting in a poor overall balance of properties.
2. The addition of small quantities of polytetrafluorethylene eliminates dripping without adversely effecting the overall balance of properties.

This latter method of drip prevention is desired because it has no negative side effects such as that mentioned for the former.

The polytetrafluorethylene of this invention, hereinafter referred to as "PTFE" for convenience, is a small particle molding resin. PTFE is commercially produced by several chemical companies, for example Halon G-80, a tradename of PTFE, manufactured by Allied Chemical Corporation, Morristown, N.J.; and Teflon 7A, a tradename of PTFE, manufactured by E. I. duPont de Nemours & Company, Wilmington, Del.

The following examples are illustrative of the principles and practices of this invention. All flammability test results listed to demonstrate these principles were obtained using the test procedures outlined in Underwriters' Laboratories Bulletins No. 94 and 484. Since minimum material flammability standards are normally determined at the thinnest fabricated part section, all results are reported for nominally 0.060 inch thick specimens. This thickness is considered a practical lower limit due to fabrication and mechanical function considerations. Materials of all compositions were prepared using melt-compounding techniques. All test specimens were injection molded.

Table I describes the concentration effects of antimony trioxide and a brominated flame-retardant additive in SAN based materials having a nominal 17 percent by weight glass fiber content. The specific flame-retardant additive used in this work was decabromodiphenyloxide.

Table I

| Sample ID | Composition (% by weight) | | | | | Flammability Testing | | |
|---|---|---|---|---|---|---|---|---|
| | SAN | Glass Fiber | Brominated Additive | Antimony Oxide | Pigment Conc. | Extinguish Within Acceptable Time | Dripping | UL Test Flammability Classification |
| 2462 | 71.05 | 17.76 | 7.11 | 3.55 | 0.52 | Yes | Yes | SE Group 2 |
| 1827 | 69.93 | 17.48 | 8.39 | 4.20 | — | Yes | Yes | V-2 |
| 1828 | 70.67 | 17.67 | 8.48 | 3.18 | — | Yes | Yes | V-2 |
| 1837 | 65.14 | 16.29 | 9.28 | 9.28 | — | Yes | Yes | V-2 |
| 1836 | 67.00 | 16.75 | 9.55 | 6.70 | — | Yes | Yes | V-2 |
| 1829 | 68.37 | 17.09 | 9.74 | 4.79 | — | Yes | Yes | V-2 |
| 1830 | 69.56 | 17.39 | 9.91 | 3.13 | — | Yes | Yes | V-2 |

These data indicate that a nominal 17 weight percent glass reinforced SAN containing about 7 to 10 percent by weight brominated flame-retardant additive and antimony trioxide in the range of about one/one to three/one parts by weight bromine-containing flame-retardant additive to antimony trioxide, extinguishes within the required time limits required by these specific tests, but has objectionable dripping characteristics.

Although the above examples are for specific brominated flame-retardant additive, data in Table II show that, at an equivalent bromine level, other similar aromatic bromine-containing flame-retardant additives in combination with antimony trioxide, flame retard other styrenic based material to the same degree as does decabromodiphenyloxide in combination with antimony trioxide.

Table II

| Sample ID | Brominated Additive Chemical Name | Composition (% By Weight) | | | | Flammability | |
|---|---|---|---|---|---|---|---|
| | | Impact Polystyrene | Aromatic Bromine Content | Brominated Additive Content | Antimony Oxide | OI | UL 94 Classification |
| 1614 | Decabromobiphenyl | 91.10 | 5.66 | 6.67 | 2.23 | 22.2 | V-2 |
| 1617 | Tetrabromotetramethylbiphenol | 85.34 | 6.27 | 11.00 | 3.66 | 23.5 | V-2 |
| 1618 | Decabromodiphenyloxide | 91.10 | 5.46 | 6.67 | 2.23 | 21.4 | V-2 |
| 1721 | Tetrobromobisphenol-A | 89.00 | 5.43 | 9.22 | 1.78 | 21.5 | just fails V-2 |
| 1615 | Decabromobiphenyl | 85.34 | 9.35 | 11.00 | 3.66 | 26.0 | V-0 |

Table II-continued

| Sample ID | Brominated Additive Chemical Name | Composition (% By Weight) | | | | Flammability | |
|---|---|---|---|---|---|---|---|
| | | Impact Poly-styrene | Aromatic Bromine Content | Brominated Additive Content | Antimony Oxide | OI | UL 94 Classification |
| 1598 | Tetrabromotetra-methylbiphenol | 80.00 | 8.55 | 15.00 | 5.00 | 26.1 | V-0 |
| 1619 | Decabromodi-phenyloxide | 85.34 | 9.02 | 11.00 | 3.66 | 25.2 | V-0 |
| 1646 | Octabromo-biphenyl | 86.20 | 8.42 | 10.35 | 3.45 | 24.6 | V-0 |
| 1594 | Decabromo-biphenyl | 80.00 | 12.75 | 15.00 | 5.00 | 28.4 | V-0 |
| 1595 | Decabromodi-phenyloxide | 80.00 | 12.30 | 15.00 | 5.00 | 29.5 | V-0 |
| 1645 | Octabromo-biphenyl | 80.00 | 12.2 | 15.00 | 5.00 | 28.8 | V-0 |

Table III confirms similar responses using tetrabromobisphenol A and decabromodiphenyloxide in the material system of this invention.

The principle of this invention is demonstrated by the data in Table IV. The data from Table I are repeated in Table IV for comparison purposes.

Table III

| Sample ID | Brominated Additive Chemical Name | Composition (% By Weight) | | | | | Flammability | |
|---|---|---|---|---|---|---|---|---|
| | | Polystyrene Acrylonitrile | Aromatic Bromine Content | Brominated Additive Content | Antimony Trioxide | Glass Fibers | Extinguishes Within Acceptable Time | Dripping |
| 1853 | Tetrabromo-bisphenol-A | 65.57 | 7.93 | 13.44 | 4.59 | 16.39 | Yes | Yes |
| 1836 | Decabromodi-phenyloxide | 67.00 | 7.83 | 9.55 | 6.70 | 16.75 | Yes | Yes |
| 1837 | Decabromodi-phenyloxide | 65.14 | 7.61 | 9.28 | 9.28 | 16.29 | Yes | Yes |
| 1829 | Decabromodi-phenyloxide | 68.37 | 7.99 | 9.74 | 4.79 | 17.09 | Yes | Yes |

Table IV

| Sample ID | Composition (% By Weight) | | | | | | Flammability Testing | | |
|---|---|---|---|---|---|---|---|---|---|
| | SAN | Glass Fiber | Brominated Additive | Antimony Oxide | PTFE | Color Conc. DU 703 N | Extinguished Within Acceptable Time | Dripping | UL Test Flammability Classification |
| 2462 | 71.05 | 17.76 | 7.11 | 3.55 | — | 0.52 | Yes | Yes | SE Group 2 |
| 1827 | 69.93 | 17.48 | 8.39 | 4.20 | — | — | Yes | Yes | V-2 |
| 1828 | 70.67 | 17.67 | 8.48 | 3.18 | — | — | Yes | Yes | V-2 |
| 1837 | 65.14 | 16.29 | 9.28 | 9.28 | — | — | Yes | Yes | V-2 |
| 1836 | 67.00 | 16.75 | 9.55 | 6.70 | — | — | Yes | Yes | V-2 |
| 1829 | 68.37 | 17.09 | 9.74 | 4.79 | — | — | Yes | Yes | V-2 |
| 1830 | 69.56 | 17.39 | 9.91 | 3.13 | — | — | Yes | Yes | V-2 |
| 2463 | 70.94 | 17.76 | 7.11 | 3.55 | 0.11 | 0.52 | Yes | No | SE Gr. 1 |
| 2454 | 70.82 | 17.76 | 7.11 | 3.55 | 0.23 | 0.52 | Yes | No | SE Gr. 1 |
| 2453 | 70.60 | 17.76 | 7.11 | 3.55 | 0.45 | 0.52 | Yes | No | SE Gr. 1 |
| 2447 | 70.16 | 17.76 | 7.11 | 3.55 | 0.89 | 0.52 | Yes | No | SE Gr. 1 |
| 2464 | 71.31 | 17.86 | 7.14 | 3.57 | 0.11 | — | Yes | Yes | SE Gr. 2 |
| 2465 | 71.31 | 17.86 | 7.14 | 3.57 | 0.11 | — | Yes | Yes | SE Gr. 2 |
| 2508 | 71.08 | 17.86 | 7.14 | 3.57 | 0.34 | — | Yes | No | SE Gr. 1 |
| 2452 | 72.75 | 18.42 | 7.37 | — | 0.92 | 0.54 | No | No | — |
| 2450 | 69.35 | 17.39 | 8.35 | 4.17 | 0.22 | 0.51 | Yes | No | SE Gr. 1 |
| 2449 | 69.13 | 17.39 | 8.35 | 4.17 | 0.44 | 0.51 | Yes | No | SE Gr. 1 |
| 2448 | 68.70 | 17.39 | 8.35 | 4.17 | 0.87 | 0.51 | Yes | No | SE Gr. 1 |
| 2509 | 69.59 | 17.48 | 8.39 | 4.20 | 0.34 | — | No | No | — |
| 1842 | 66.11 | 16.53 | 9.42 | 4.63 | 3.31 | — | Yes | No | V-0 |
| 1889 | 67.18 | 17.01 | 9.69 | 4.76 | 0.85 | 0.50 | Yes | No | SE Gr. 1 |
| 2445 | 67.18 | 17.01 | 9.69 | 4.76 | 0.85 | 0.50 | Yes | No | SE Gr. 1 |
| 1888 | 67.52 | 17.09 | 9.74 | 4.79 | 0.85 | — | Yes | No | SE Gr. 1 |
| 1850 | 67.52 | 17.09 | 9.74 | 4.79 | 0.85 | — | Yes | No | SE Gr. 1 |
| 1849 | 66.66 | 17.09 | 9.74 | 4.79 | 1.71 | — | Yes | No | SE Gr. 1 |
| 1848 | 65.81 | 17.09 | 9.74 | 4.79 | 2.56 | — | Yes | No | SE Gr. 1 |
| 2448 | 68.23 | 17.27 | 9.85 | 3.28 | 0.86 | 0.50 | Yes | No | SE Gr. 1 |
| 2451 | 70.54 | 17.86 | 10.18 | — | 0.89 | 0.52 | Yes | No | SE Gr. 1 |

These data indicate that a nominal 17 weight percent glass reinforced SAN compound containing about 7 to 10 percent by weight bromine-containing flame-retardant additive and antimony trioxide in the range of about one/zero to two/one parts by weight bromine-containing flame retardant additives to antimony trioxide do not drip when they contain at least about 0.1 percent by weight of PTEE. This is true regardless of whether or not they extinguish within the time limits required by these specific tests. This PTFE level is selected as the minimum level. The upper level of PTFE is dependent on economics and mechanical properties. The practical operating level of PTFE is dependent on the dispersion capability of the specific production melt compounding technique being used.

Data in Table V indicate that the addition of PTFE eliminates objectionable dripping at glass fiber levels as low as 10 percent by weight. They also show, as previously discussed, that PTFE is not required to eliminate drip at greater than 30 percent by weight glass fibers.

Table V

| Sample ID | Composition (% By Weight) | | | | | | Flammability Testing | | |
| --- | --- | --- | --- | --- | --- | --- | --- | --- | --- |
| | SAN | Glass Fiber | Brominated Additive | Antimony Oxide | Pigment Conc. | PTFE | Extinguish Within Acceptable Time | Dripping | UL Test Flammability Classification |
| 2540 | 78.25 | 10.02 | 7.82 | 3.91 | — | — | Yes | Yes | SE Gr. 2 |
| 2538 | 77.87 | 10.02 | 7.82 | 3.90 | — | 0.38 | Yes | No | SE Gr. 1 |
| 2541 | 60.86 | 30.01 | 6.09 | 3.04 | — | — | Yes | No | SE Gr. 1 |
| 2539 | 60.57 | 30.01 | 6.09 | 3.04 | — | 0.29 | Yes | No | SE Gr. 1 |

Other modifications and alterations of this invention will become apparent to those skilled in the art from the foregoing discussion, and it should be understood that this invention is not to be unduly limited thereto.

What is claimed is:

1. A composition comprising:
   about 50 to about 80 weight percent of a styrene-acrylonitrile copolymer, reinforcing glass fibers in the range of about 8 to about 30 weight percent, a brominated flame-retarding additive, and polytetrafluorethylene in an amount sufficient to prevent dripping of the composition at flaming combustion conditions, said brominated flame-retarding additive being one of a brominated biphenyl or a brominated biphenyl oxide.

2. A composition, as set forth in claim 1, including antimony oxide.

3. A composition, as set forth in claim 1, wherein the brominated flame-retarding additive is decabromodiphenyloxide.

4. A composition, as set forth in claim 3, including antimony oxide.

5. A composition, as set forth in claim 1, wherein the flame-retarding additive is decabromodiphenyloxide in an amount of at least about 7 weight percent, and the polytetrafluorethylene is in an amount of at least about 0.1 weight percent.

6. A composition, as set forth in claim 5, including antimony oxide and wherein the ratio of the decabromodiphenyloxide to the antimony oxide is in the range of about 3:1 to about 1:1.

7. A composition, as set forth in claim 1, including antimony oxide and wherein the ratio of the brominated flame-retarding additive to the antimony oxide is in the range of about 3:1 to about 1:1.

* * * * *